United States Patent

Strenglein

[15] 3,683,381
[45] Aug. 8, 1972

[54] HIGH FREQUENCY TEST DEVICE
[72] Inventor: Harry F. Strenglein, Clearwater, Fla.
[73] Assignee: Sperry Rand Corporation
[22] Filed: Feb. 1, 1971
[21] Appl. No.: 111,393

[52] U.S. Cl..................................343/17.7, 35/10.4
[51] Int. Cl..................................................G01s 7/40
[58] Field of Search.......................343/17.7; 35/10.4

[56] References Cited

UNITED STATES PATENTS 3,164,835  1/1965  Alsberg................343/17.7 X
3,214,758  10/1965  Mills et al.................343/17.7
3,229,289  1/1966  Stine..........................343/17.7

*Primary Examiner*—T. H. Tubbesing
*Attorney*—S. C. Yeaton

[57] ABSTRACT

A high frequency signal generator and calibrated radiator system for providing signals for testing the tracking response of a radar receiver system simulates an apparent target rapidly movable along a line substantially at right angles to the direction of the system under test.

7 Claims, 3 Drawing Figures

INVENTOR
HARRY F. STRENGLEIN
BY
*HP Terry*
ATTORNEY

3,683,381

HIGH FREQUENCY TEST DEVICE

BACKGROUND OF THE INVENTION

1. Field of the Invention

The invention pertains to the art of measurement of the tracking response of radar receiver systems and more particularly relates to means for generating signals permitting measurement of the behavior of rapid response monopulse tracking radar receiver devices.

2. Description of the Prior Art

Prior art techniques for testing the tracking response of radar receivers to an apparent moving target have not proven adequate for investigation of the characteristics of modern highly sensitive tracking radar receivers. For investigation of older types of receivers, the apparent target has sometimes been simulated by gross mechanical movement of an element of an excited test antenna so that the apparent target position moves along a line generally perpendicular to the direction to the radar device under test. At other times, physical switching of the excitation between first and second test antennas has been employed. In testing modern receivers that use monopulse techniques, calibrated, repeatable rates of change of the apparent target position of the order of a degree per microsecond are required. Such a requirement cannot be satisfactorily approached by the prior art methods or apparatus, as will be further explained.

SUMMARY OF THE INVENTION

The present invention relates to a calibrated high frequency signal generation and radiation system for providing signals for the testing of the angular tracking response of sensitive monopulse tracking radar apparatus. The test signal generator system simulates a target movable rapidly in a predetermined manner along a line substantially at right angles to the direction of the monopulse receiver being tested.

DESCRIPTION OF THE PREFERRED EMBODIMENT

Figure 1:
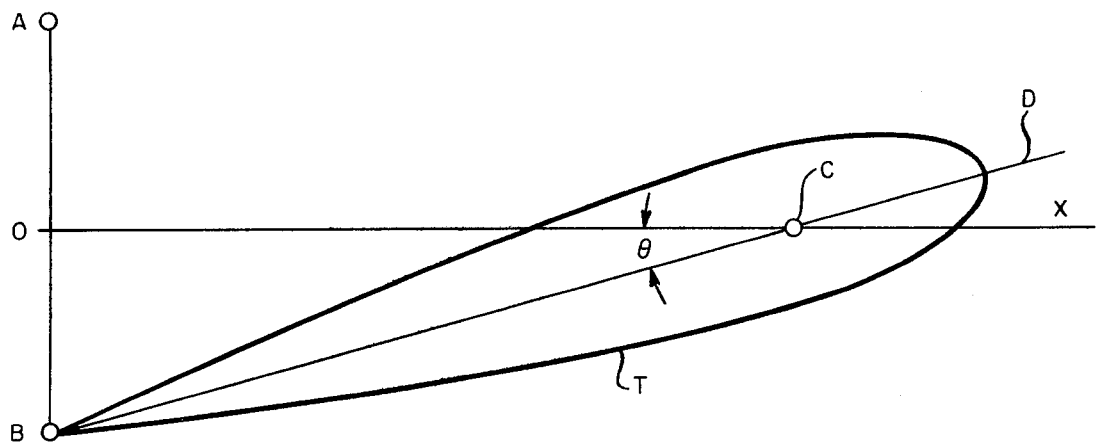
FIG. 1 is a graphical diagram useful in explaining the problem solved by the invention.

Referring to FIG. 1, it is desired according to the present invention to test the characteristics of a monopulse radar target tracking receiver system by moving the apparent location of a simulated target at a rapid but controlled rate. For testing monopulse receivers, it is desired to move the apparent target at a rate much greater than is possible by mechanical means. It is also desired to use means accurately repeatable and calibratable, especially as to the zero or null position of the apparent target. For example, assume that the circle C in FIG. 1 represents the locus of a monopulse device whose response is to be examined and that circle C lies on a reference axis OX, to which line AOB is substantially perpendicular. According to the requirements for making meaningful tests of the monopulse devices, it must be possible to move an apparent target along the substantially perpendicular line AOB at a predetermined rapid rate and to know accurately the location of the origin O. For example, these requirements apply to the rapid motion of an apparent target located instantaneously at point B and radiating an antenna pattern T symmetrically located with respect to an axis BD while illuminating a monopulse device at location C. In effect, it is desired to vary the angle $\theta$ between axes OX and BD rapidly and in a bipolar sense about its zero value.

Figure 2:
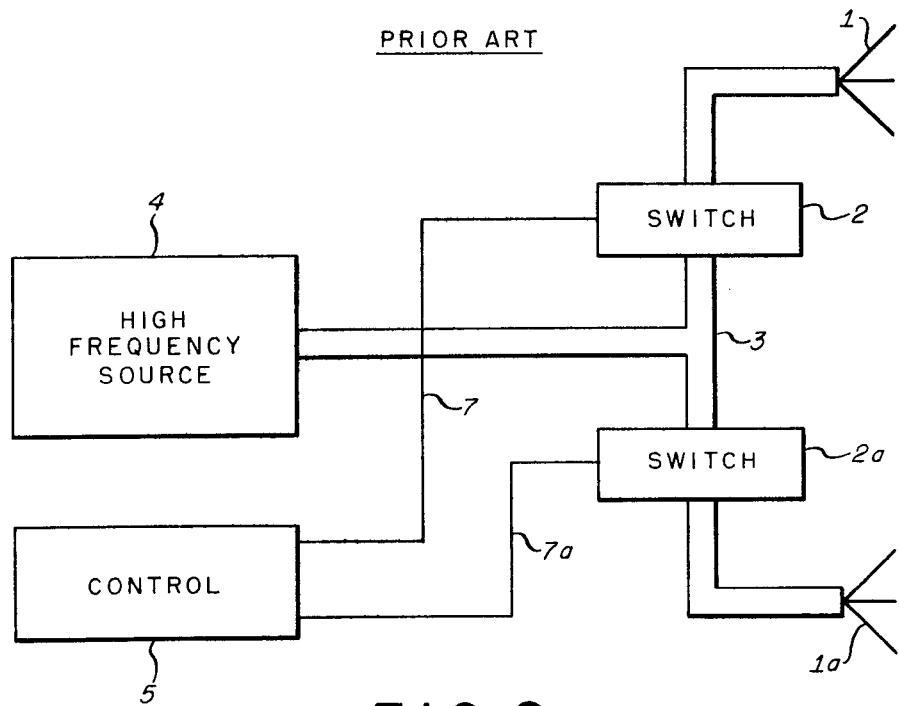
FIG. 2 is a block diagram showing the connections of electrical components of a prior art signal generator.

Prior art electrical test systems for producing apparent target motion do not fit the needs of equipment satisfactory for testing monopulse devices. For example, FIG. 2 illustrates a prior art system consisting of spaced antennas 1 and 1a that are usually directional and fed co-phasally with high frequency energy propagated into the antennas by tee junction 3. The third port of tee 3 is supplied with high frequency energy by the pulsed high frequency source 4. Between antenna 1 and tee 3 is interposed a switch or attenuator 2; similarly, between antenna 1a and tee 3, there is interposed a second switch or attenuator 2a. Devices 2 and 2a are operated according to reciprocal output signals of control 5, which may be a manual or automatically operated device. Devices 2, 2a may be electrically variable attenuators of a well known type, or may be semiconductor diode switching devices. The drive signals supplied respectively by leads 7, 7a to switches 2, 2a operate in a reciprocal manner; i.e., when the signal on lead 7 causes switch 2 to conduct, that on lead 7a places switch 2a in its non-conducting state and vice versa. In use, the device of FIG. 2 would be located at the origin O in FIG. 1.

Whether attenuators or switches are employed in the prior art system of FIG. 2, certain problems arise. At the time that the apparent target should be at its null position (angle $\theta$ in FIG. 1 is then zero), the attenuators or switches should have equal insertion phase characteristics and minimum insertion losses so that equal power is fed co-phasally to each antenna 1, 1a. At this point, any phase or amplitude asymmetry in the switches or attenuators results in a corresponding unbalance in the power delivered to antennas 1, 1a. This, in turn, yields an erroneous indication of the apparent target position as seen by the monopulse device under test.

If high frequency switches employing diodes are used, the diodes selected are usually p-i-n diodes. However, even these diodes switch rapidly only when considerably overdriven. When used as linear control devices, they have comparatively slow and non-linear response. Also, the response is not desirably repeatable because of the charge carrier life time characteristics of such semiconductor devices.

Figure 3:
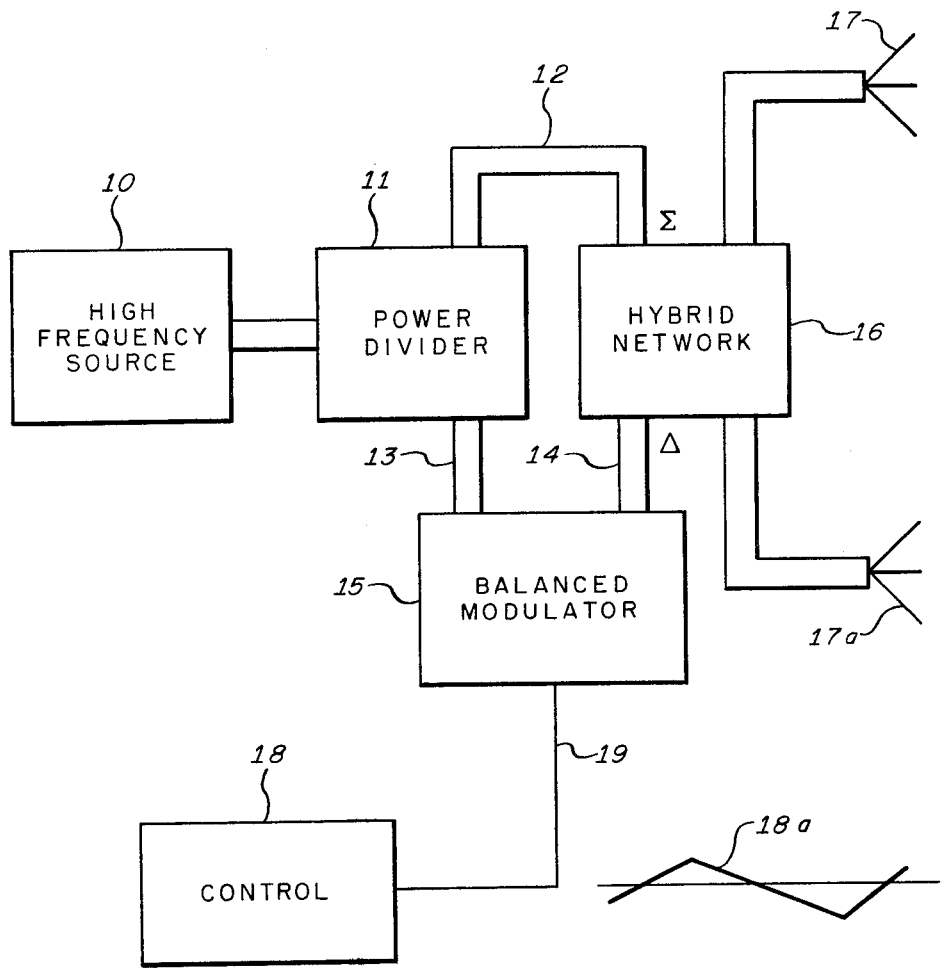
FIG. 3 is a block diagram showing the electrical components and their connections in a preferred form of the invention.

According to the embodiment of the invention shown in FIG. 3, the difficulties of the prior art are overcome. The device of FIG. 3 would be placed at the origin O of FIG. 1 and employs a pair of spaced antennas 17 and 17a directed in parallel relation toward the monopulse device to be tested. Antennas 17 and 17a are respectively fed from symmetric ports of hybrid network 16, which latter may be a conventional hybrid junction of the magic tee type.

For exciting antennas 17, 17a, pulsed high frequency or microwave energy is fed by source 10 to an input port of the equal power divider 11, which latter may be a simple tee junction or a 3 dB hybrid network. Half of the input power is fed directly by transmission line 12 to the sum port Σ of hybrid network 16. The other half of the power supplied by divider 11 is fed by transmission line 13 to a conventional high frequency microwave balanced modulator 15 whose output port is connected by transmission line 14 to the difference port Δ of hybrid network 16. Balanced modulator 15 is of the electronically controllable type, so that a voltage analogous to the desired apparent target position may be introduced into it on electrical lead 19, such as a repeating triangular voltage wave 18a. The control voltage on lead 19 may be manually or automatically generated by control or function generator 18. The effective transmission line lengths of line 12 and of the line composed of lines 13 and 14 and modulator 15 are so arranged that the output of modulator 15 when driven by its maximum control voltage appears at one antenna in phase with the sum port Σ signal and at the other port in phase opposition. The respective transmission lines between hybrid network 16 and antennas 17 and 17a have equal lengths. Fixed attenuation may be placed in transmission line 12 or an unequal power divider may be used in place of equal power divider 11 to compensate for the insertion loss of balanced modulator 15. However, the refinement is not essential, because the absence of such compensation merely alters the achievable range of apparent target motion and does not affect the null position or the calibration of the device.

According to one manner of operation of the invention, when the control signal supplied by control 18 to the balanced amplitude modulator 15 is at its zero level, the output of modulator 15 is substantially zero. Then, all of the power supplied by source 10 is fed to hybrid network 16 via the sum port Σ. Since equal power is then fed to antennas 17 and 17a, the apparent source of the radiated energy is at the center of the array (half way between antennas 17 and 17a), which center is understood to be located at the origin O of FIG. 1. Thus the pair of antennas 17 and 17a form an antenna array having 3 dB more gain than either of the individual antennas.

When the triangular or other control voltage fed by lead 19 to balanced modulator 15 reaches one of its two extreme values, equal halves of the power are fed to the respective sum and difference ports Σ and Δ of network 16. Because of the inherent well known phase modifying characteristics of network 16, all power is then fed by network 16 to only one of the antennas 17, 17a, none emanating from the other antenna. The apparent target position then coincides with the position of the antenna having maximum output. The total effective radiated power remains the same as indicated in the condition discussed in the preceding paragraph.

When the control voltage fed by lead 19 to balanced modulator 15 reaches the second of its two extreme values, equal halves of the power are fed again to the respective sum and difference ports Σ and Δ of network 16, but now with a relative 180° phase difference. Consequently, the antenna at which maximum power was present in the condition of the immediately preceding paragraph no longer radiates and the antenna that previously radiated no power radiates maximum power, the apparent target position being shifted to it. Intermediate conditions of modulator 15 cause the apparent source to be located at a corresponding position lying between antennas 17, 17a.

The use of a balanced modulator such as device 15 in only one arm of the system has important consequences. When modulator 15 is in its zero output condition, not only is equal power delivered to both antennas 17, 17a, but the sum of the powers delivered to antennas 17, 17a is half of the available power. When the power is delivered to a single one of the two antennas, all of the power is delivered. The important characteristic of the combination including the single balanced modulator 16 is that it matches the characteristic of the antenna array so that constant power is radiated toward the device under test for any condition of balanced modulator 15. Further, the antennas 17, 17a remain properly isolated and the location of and symmetry about the zero or null position of the apparent target are readily assured.

The broad band, balanced modulator 15 is a desirable control device, since the amplitude of its high frequency output is linearly proportional to the modulating voltage appearing on lead 19, permitting linear motion of the apparent target location. Further, unlike the prior art diode switching device, it does not use semiconductor devices such as p-i-n diodes and the consequent large and variable delay between the switch drive voltage and the state of the corresponding output high frequency amplitude is eliminated.

While the apparatus involved in observing or recording the perfection of angular response of the monopulse device under test is not a necessary part of this invention, it will be apparent to those skilled in the monopulse radar art and in the servomechanisms art that a direct measure of the angular sensing response of the monopulse device may readily be compared as to relative phase and amplitude with the voltage appearing upon control lead 19. Lag of the response and other peculiarities of the system under test may be analyzed, for instance, according to the methods conventionally used with prior art test apparatus such as that of FIG. 1. It will be apparent to those skilled in the art that the novel apparatus is equally useful with monopulse and other types of angular tracking radar systems.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Signal generator apparatus for generating signals permitting testing of the angular response of an angular tracking receiver comprising:
   signal source means having output means,
   power divider means connected to said output means and having first and second port means,
   hybrid network means having sum port means, difference port means, and third and fourth port means, first and second antenna means respectively connected to said third and fourth port means and comprising antenna array means adapted for space propagation of said signals from an effective radiation center adjacent said array means, first transmission line means connecting said first port means and said sum port means, second transmission line means connecting said second port means and said difference port means, and modulator means connected in one of said transmission line means operable to cause adjustable shifting of said effective radiation center along said array means.

2. Apparatus as described in claim 1 wherein said modulator means comprises balanced amplitude modulator means.

3. Apparatus as described in claim 2 comprising function generator means for controlling the state of said balanced modulator means.

4. Apparatus as described in claim 3 wherein said signal source means, said power divider means, said antenna array means, said transmission line means, said balanced modulator means, and said function generator means are so constructed and arranged as to afford substantially constant power radiation independent of the location of said effective radiation center along said array means.

5. Apparatus as described in claim 4 wherein said power divider means substantially equally divides power between said first and second port means.

6. Apparatus as described in claim 5 wherein said modulator means is located in said second transmission line means.

7. Apparatus as described in claim 6 wherein said function generator means comprises a generator of triangular waves.

* * * * *